United States Patent Office 3,072,760
Patented Jan. 8, 1963

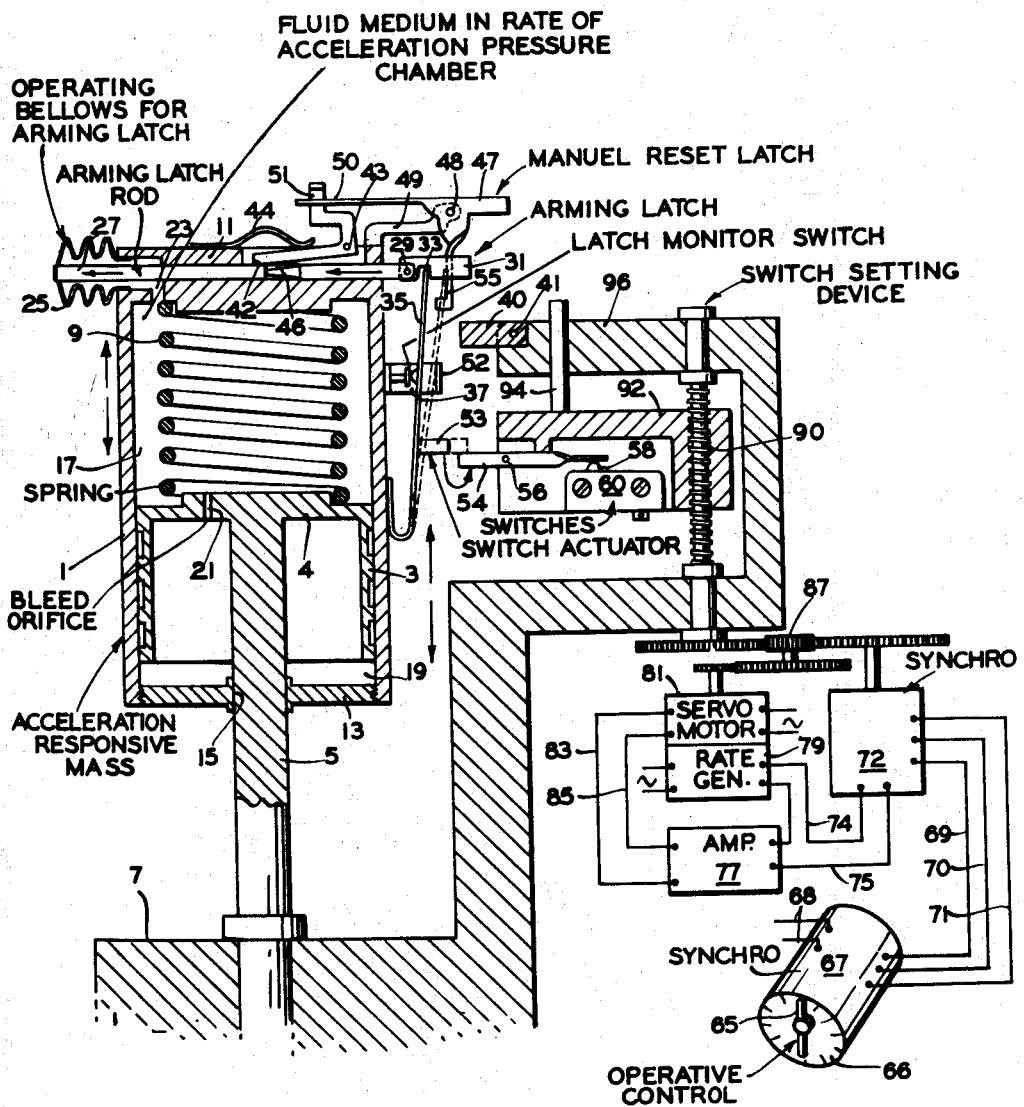

3,072,760
ACCELERATION RESPONSIVE SWITCH AND
CONTROL MECHANISM
Edward J. Hazen, Westwood, N.J., assignor to The Bendix Corporation, a corporation of Delaware
Filed Sept. 26, 1960, Ser. No. 58,465
11 Claims. (Cl. 200—61.45)

This invention relates to an acceleration responsive switch mechanism and more particularly to a mechanism including an acceleration sensor with associated levers and latches, a rate of change of acceleration pressure chamber, and a switch setting device with associated gearing and servo loop.

An object of the invention is to provide in such switch mechanism a rate of change of acceleration responsive device, together with a fluid filled chamber having a piston cooperating therein in response to accelerational forces to effect through operation of a fluid pressure responsive bellows withdrawal of an arming latch rod upon an excessive rate of change of acceleration persisting for a predetermined interval of time.

Another object of the invention is to so arrange the aforenoted mechanism that a shock or high rate of change of acceleration will cause the arming latch rod to be withdrawn so that switch mechanisms normally operative by the arming latch under predetermined acceleration and deceleration conditions are no longer operative until such time as the arming latch may be manually reset.

Another object of the invention is to provide a novel hydro-mechanical device sensitive to rate of change of acceleration.

Another object of the invention is to provide a novel acceleration responsive switch mechanism arranged to operate during a rising acceleration, for example, of between 32 and 50 g, and so arranged as not to respond to shock inputs up to a maximum value of, for example, 100 g applied at a rate greater than a minimum value of, for example, 20 g per second.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

The drawing is a functional diagrammatic showing of the acceleration responsive switch and control mechanism.

The mechanism includes an acceleration or "G" responsive weighted member or mass 1 slidably mounted on a piston member 3 having a head portion 4 carried by a rod 5 affixed to a base or support member 7 carried by an aircraft or missile subject to accelerational forces. A spring member 9 is positioned between the head portion 4 and an underside of an upper plate 11 of the acceleration responsive member 1. A lower plate 13 is carried by the acceleration responsive member 1 at the opposite side of the head portion 4 and is slidably mounted at 15 on the rod 5.

The upper and lower plates 11 and 13 respectively provide in the acceleration responsive mass 1 closed chambers 17 and 19 at opposite sides of the head portion 4 of the piston member. A suitable fluid medium is provided in the chambers 17 and 19 and operatively connected through a bleed orifice 21 provided in the head portion 4 so that upon the acceleration responsive member 1 tending to move downwardly against the biasing force of the spring 9 under positive accelerational forces, the fluid medium in the chamber 17 is compressed while the restricted orifice 21 permits the compressed fluid medium to bleed from the chamber 17 to the chamber 19 so as to tend to balance the pressures applied therein after a delay period dependent upon the rate of change of the acceleration responsive fluid pressure applied in the chamber 17. Similarly upon the acceleration responsive member 1 moving upwardly as upon a negative or decrease in the accelerational force applied thereto, the compressed fluid medium in the chamber 19 is bled through the fluid medium in the chamber 19 is bled through the restricted orifice 21 to the chamber 17 so as to tend to balance the pressure applied therein after a delay period dependent upon the rate of change in such acceleration responsive fluid pressure applied in the chamber 19.

The fluid pressure applied in the chamber 17 is in turn applied through a passage 23 in the upper plate 11 leading into a flexible bellows 25 carried by the plate 11 and having a free end operatively connected interiorly to one end of an arming latch rod 27 slidably mounted in the end plate 11. The opposite end of the arming latch rod 27 has pivotally connected thereto by a pin 29 an arming latch 31 releasably engaging in a notch 33 one end of a leaf spring 35. The spring 35 is affixed at the opposite end to the side of the acceleration responsive member 1 and the leaf spring 35 in the latched position closes a switch contact 37. The arrangement is such that normally the acceleration responsive member 1 in moving downwardly under accelerational forces causes the arming latch 31 to engage at its free end an actuating member 40 so as to cause the arming latch 31 to be pivoted in a counter-clockwise direction about the pin 29 so as to release the leaf spring 35 under the spring tension thereof to open the monitor switch contact 37 as indicated by dotted lines in the drawing. The actuating member 40 may be freely pivoted at 41 in a clockwise direction so as to permit a return upward movement of the arming latch 31 free of the actuating member 40.

It is required that the latching release be accomplished during a rising acceleration of, for example, between 32 and 50 g, and it is a further requisite that such latching release not be effected in response to shock inputs of, for example, up to 100 g applied at a rate greater than 20 g per second. In order to meet such requirements, there is included in the control mechanism a rate-of-change-of-acceleration sensor, whereby the latch release device is rendered inoperative under excessive shock input conditions.

In the last mentioned arrangement, the pressure produced within the fluid filled chamber 17 above the stationary piston 3 is a measure of the rate-of-change-of-acceleration. The orifice 21 in the head 4 of the piston 3 may be calibrated in conformity to an active area-and-spring combination represented by the bellows 25 so that the arming latch rod 27 will withdraw into the upper plate 11 under an increased fluid pressure applied interiorly to the bellows 25 in response to excessive shock conditions of, for example, a 20 g per second rate-of-change-of-acceleration which persists for a predetermined interval of time. In such action, a pawl 42 pivoted at 43 is biased by a leaf spring 44 into engaging relation in a notch 46 provided in the rod 27 so as to retain the rod 27 in its withdrawn position and prevent the arming latch 31 from engaging the actuating member 40 or releasing the leaf spring 35 upon a downward movement of the acceleration responsive member 1 in response to acceleration forces acting thereon.

The pawl 42 in the engaged position retains the rod 27 in its withdrawn position until it is reset manually by the operator actuating a manual reset latch 47. The reset latch 47 is pivoted on a pin 48 carried by an arm 49 affixed to the member 1. The latch 47 has an arm 50 which upon clockwise movement of the manual reset latch 47 about the pin 48 actuates a cooperating arm portion 51 of the pawl 42 in a clockwise direction about the pin 43 so as to disengage the pawl 42 from the notch 46 and permit the rod 27 under the spring force of the leaf spring 35 to return to the normal position, the increased fluid pressure applied, as heretofore explained interiorly to the bellows 25 having receded with the passing of the excessive shock condition.

During the normal operation, the downward movement of the member 1 in response to the positive accelerational forces applied thereto is effective to cause the member 40 to trip the arming latch 31 releasing the leaf spring 35 which under spring tension moves to the indicated dotted line position, where the same is held in such position by a bracket 52. The release of the leaf spring 35 opens a switch contact 37 controlling a suitable electrical control circuit or indicator lamp, not shown. Further, the release of the leaf spring 35 positions a switch actuator 53 carried thereby into an operative position, shown in the drawing by doted lines, and effective upon a return upward movement of the member 1 to operate a switch operating arm 54 as upon a decrease in the accelerational force applied to the member 1.

Upon completion of the aforenoted cycle of normal operation, the leaf spring 35 may be returned to the latched position by the operator actuating the manual reset latch 47 in a clockwise direction about pin 48 so as to cause an arm 55 depending therefrom and cooperating with the leaf spring 35 to position the spring 35 from the dotted line position to the solid line position and in engagement by the arming latch 31, as shown by the drawing, whereupon the mechanism is once again in position for a cycle of normal operation.

Further, during the cycle of normal operation and upon a decrease in the accelerational forces applied to the member 1, the operating arm 54 is pivoted at 56 by the switch actuator 53 so as to in turn operatively engage an actuating button 58 for operating a conventional miniature type switch mechanism 60. The switch mechanism 60 may be normally biased by a suitable operating spring means, not shown, so as to effectively hold the switch mechanism 60 in an open circuit position until actuation of the button 58 by the arm 54 as aforesaid to render operative suitable control circuits effectively controlled by the switch mechanism 60.

The switch mechanism 60 may be of a suitable multiple switch type including two or more single pole, single throw circuits operatively controlled by actuation of the button 58 so as to selectively close suitable control circuits under predetermined operating conditions of, for example, within 0.1 g of each other during a decreasing acceleration and after first being subjected to an increasing acceleration.

In the aforenoted arrangement, a normal operating cycle would commence when the imposed acceleration, g, increases at a rate not exceeding a preset value, such as a rate of 20 g per second, and to beyond a preset value of, for example, 50 g. Such acceleration will cause the member 1 to move down carrying the arming latch 31 therewith and into engaging relation with the surface of the actuating member 40, for releasing the leaf spring 35 so as to serve to position in turn the switch actuator 53 and open the latch monitor switch 37 controlling a suitable indicator circuit at a predetermined instantaneous acceleration condition of, for example, 41 g.

The member 1 will travel beyond the surface of the actuating member 40 depending on the maximum value of the increasing acceleration. The direction of travel of the member 1 will change when decreasing acceleration occurs whereupon the switch actuator 53 on the return movement thereof will engage the lower edge of the operating arm 54 at a preset point so as to actuate the button 58 of the switch mechanism 60 to close the circuit or circuits controlled thereby. The closing of the control circuits may be either an instantaneous closure at the preset point or a continuous closure for values below the set point.

The adjustment for the set point is accomplished at a remote location by rotatably positioning an operative control member 65 cooperating with an adjustment indicator scale 66 and coupled to a signal transmitting synchro 67 energized from a suitable source of alternating current through input conductors 68 and electrically connected through output signal conductors 69, 70 and 71 to a signal receiving synchro 72 having signal output conductors 74 and 75 leading to the input of an amplifier 77 through a rate generator 79 of conventional type and arranged so as to provide an anti-hunting signal. The generator 79 is driven by a servo motor 81 in a direction dependent upon the phase of the electrical signal applied through the amplifier 77 and to the servo motor 81 through conductors 83 and 85. The servo motor 81 may be of a conventional two-phase type.

The servo motor 81 drives through gearing 87 a rotor of the synchro 72 in a direction to nullify the control signal applied through the lines 74 and 75 while adjustably positioning a screw shaft 90 engaged in a supporting member 92 carrying the switch mechanism 60 and operating arm 54 pivotally connected thereto at 56. The member 92 is held from rotary movement by a pin 94 slidably mounted in a supporting arm 96 so that angular adjustment of the screw shaft 90 serves to vary the position of the switch operating arm 54 relative to the position of the switch actuator 53 to in turn set the value of the acceleration force at which the switch mechanism 60 is to be actuated upon the return upward movement of the switch actuator 53. The actuating member 40 is pivotally mounted on the supporting arm 96 so as to permit the arming latch 31 to freely move upward relative to said actuating member 40 while the actuating member 40 is effective to engage and release the arming latch 31 upon downward movement of the weighted member 1 in response to positive accelerational forces.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An acceleration responsive mechanism comprising a weighted member, a piston fixedly mounted on a supporting member subject to accelerational forces, said weighted member being slidably mounted on said piston and defining with said piston a pair of closed chambers at opposite sides of said piston for carrying a fluid medium, said piston having a restricted orifice therethrough for conducting the fluid medium under pressure between said chambers upon movement of the weighted member relative to said piston in one sense in response to positive accelerational forces, spring means for biasing said weighted member in an opposite sense, fluid pressure responsive bellows means carried by said weighted member and subject to the pressure of the fluid pressure medium effected in one of said chambers by movement of said weighted member in said one sense, and control means operatively connected to said fluid pressure responsive bellows means for effecting a control function upon the accelerational forces acting upon said weighted member changing at a rate in excess of a predetermined value for a predetermined interval of time.

2. An acceleration responsive mechanism comprising a weighted member, a piston fixedly mounted on a supporting member subject to accelerational forces, said weighted member being slidably mounted on said piston and defining with said piston a pair of closed chambers at opposite sides of said piston for carrying a fluid medium, said piston having a restricted orifice therethrough for conducting the fluid medium under pressure between said chambers upon movement of the weighted member relative to said piston in one sense in response to positive accelerational forces, spring means for biasing said weighted member in an opposite sense, fluid pressure responsive means carried by said weighted member and subject to the pressure of the fluid pressure medium effected in one of said chambers by movement of said weighted member in said one sense, a rod slidably mounted in an end portion of said weighted member and operatively connected at one end to said fluid pressure responsive means, latch means pivotally mounted at the other end of said rod, a leaf spring affixed at one end to a side portion of said weighted member and having another end releasably engaged by said latch means, a first actuator member carried by said leaf spring intermediate the opposite ends thereof, a second member to actuate said latch means upon movement of said weighted member in said one sense in response to the positive accelerational forces so as to pivotally actuate the latch means to release the other end of said leaf spring and thereby condition the first actuator member for operation upon movement of said weighted member in the opposite sense under the biasing force of said spring means and in response to a decrease in said accelerational forces, and control means operative by said first actuator member when in said operative condition during movement of the weighted member in said opposite sense, said rod being actuated by the fluid pressure responsive means so as to effectively position said latch means out of actuating relation with said second member upon the positive accelerational forces acting upon said weighted member changing at a rate in excess of a predetermined value for a predetermined interval of time and thereby cause the pressure of the fluid medium in said one chamber to exceed a predetermined maximum value, and an arming latch to releasably engage said rod upon the actuation thereof so as to retain the rod in the actuated relation.

3. An acceleration responsive mechanism comprising a weighted member, a piston fixedly mounted on a supporting member subject to accelerational forces, said weighted member being slidably mounted on said piston and defining with said piston a pair of closed chambers at opposite sides of said piston for carrying a fluid medium, said piston having a restricted orifice therethrough for conducting the fluid medium under pressure between said chambers upon movement of the weighted member relative to said piston in one sense in response to positive accelerational forces, spring means for biasing said weighted member in an opposite sense, fluid pressure responsive means carried by said weighted member and subject to the pressure of the fluid pressure medium effected in one of said chambers by movement of said weighted member in said one sense, latch means pivotally mounted on said weighted member, a leaf spring affixed at one end to a side portion of said weighted member and having another end releasably engaged by said latch means, a first actuator member carried by said leaf spring intermediate the opposite ends thereof, a second member to actuate said latch means upon movement of said weighted member in said one sense in response to the positive accelerational forces so as to pivotally actuate the latch means to release the other end of said leaf spring and thereby condition the first actuator member for operation upon movement of said weighted member in the opposite sense under the biasing force of said spring means and in response to a decrease in said accelerational forces, and control means operative by said first actuator member in said operative condition during movement of the weighted member in said opposite sense.

4. The combination defined by claim 3 including operator-operative means for adjustably positioning said control means relative to said first actuator member so as to vary the accelerational condition at which said control means may be operated by said first actuator member.

5. The combination defined by claim 3 including a rate of change of acceleration responsive device to render said latch means ineffective to release said leaf spring upon an excessive rate of change of acceleration persisting for a predetermined interval of time whereupon said first actuator member may be held by said leaf spring in an inoperative relation relative to said control means.

6. An acceleration responsive device comprising a "G" responsive member, means for mounting the member for movement in one sense in response to positive accelerational forces, a spring for biasing the member so as to impart movement thereto in an opposite sense upon a decrease in said accelerational forces, another spring having one end affixed to said "G" responsive member, a latch member for engaging another end of said other spring, an actuating member carried by said other spring, control means for operation by said actuating member, and means for operating said latch member so as to disengage the other end of said spring to render the actuating member carried thereby effective to operate said control means.

7. An acceleration responsive device comprising a "G" responsive member, means for mounting the member for movement in one sense in response to positive accelerational forces, a spring for biasing the member so as to impart movement thereto in an opposite sense upon a decrease in said accelerational forces, another spring having one end affixed to said "G" responsive member, a latch member for engaging another end of said other spring, an actuating member carried by said other spring, control means for operation by said actuating member, and means for operating said latch member so as to disengage the other end of said spring upon the accelerational forces exceeding a predetermined value whereupon the actuating member carried by said spring is thereby rendered effective to operate said control means upon the accelerational forces decreasing below a predetermined value.

8. The combination defined by claim 7 including a rate of change of acceleration responsive device to render said latch means ineffective to disengage the other end of said spring upon a predetermined excessive rate of change of acceleration persisting for a predetermined interval of time whereupon said actuating member may be held by said spring so as to be ineffective to operate said control means upon the accelerational forces decreasing.

9. In a switch mechanism of a type including a cylinder, a piston disposed in said cylinder, said cylinder being movable relative to said piston under accelerational forces so as to effect relative movement of the piston from an initial position at one end of said cylinder to a second position toward the other end of said cylinder, a spring compressed between said piston and said other end of said cylinder, and a switch means disposed at one side of said cylinder, said switch means having at least one part thereof disposed for operative actuation; the improvement comprising a spring member having one end thereof mounted on said cylinder, a latch means carried by said cylinder for releasably engaging another end of said spring member, means to actuate said latch means so as to disengage said other end of the spring member, and an actuating member carried by said spring member, said spring member being effective upon the disengagement thereof to position said actuating member into operative relation with said one part of the switch means to operatively actuate the switch means under predetermined accelerational conditions.

10. The combination defined by claim 9 in which said cylinder and piston define a pair of closed chambers at opposite sides of said piston for carrying a gaseous pressure medium, said piston having a restricted orifice therethrough for conducting the gaseous medium under pressure in one of said chambers to the other of said chambers upon movement of the cylinder relative to said piston in response to positive accelerational forces, a pressure responsive bellows carried by said cylinder and interiorly connected to the gaseous pressure medium in said one chamber, and means operatively connected to said bellows for rendering said latch means ineffective to disengage said other end of the spring member upon the accelerational forces acting upon said cylinder changing at a rate in excess of a predetermined value during a predetermined interval of time.

11. In an acceleration responsive device of a type including a mass having a longitudinal axis, bearing means supporting said mass for movement in the direction of said axis in response to accelerations having components in either direction along said axis, and spring means biasing said mass in one direction along said axis; the improvement comprising switch means at one side of said movable mass, switch actuating means carried by said movable mass for operating said switch means under predetermined accelerational conditions, a bellows carried by said movable mass, said bearing means including a piston effective upon relative movement of said mass in one sense for applying a fluid medium under pressure to said bellows, and means operated by said bellows in response to the pressure of said fluid medium for rendering said switch actuating means ineffective under predetermined excessive accelerational conditions.

References Cited in the file of this patent

UNITED STATES PATENTS

| | | |
|---|---|---|
| 2,713,097 | Wooten | July 12, 1955 |
| 2,854,539 | Ruppel | Sept. 30, 1958 |
| 2,881,277 | Marks et al. | Apr. 7, 1959 |
| 2,950,908 | Rainsberger et al. | Aug. 30, 1960 |
| 2,974,529 | Brueggeman et al. | Mar. 14, 1961 |